US005737695A

United States Patent [19]

Lagerqvist et al.

[11] Patent Number: 5,737,695

[45] Date of Patent: Apr. 7, 1998

[54] METHOD AND APPARATUS FOR CONTROLLING THE USE OF DISCONTINUOUS TRANSMISSION IN A CELLULAR TELEPHONE

[75] Inventors: Tomas Lagerqvist, Stockholm; Peter Wahlström, Bromma, both of Sweden

[73] Assignee: Telefonaktiebolaget LM Ericsson, Stockholm, Sweden

[21] Appl. No.: 781,887

[22] Filed: Dec. 21, 1996

[51] Int. Cl.[6] .......... H04B 1/46

[52] U.S. Cl. .......... 455/79; 455/403; 455/517; 455/524; 455/561; 455/436; 395/2.35; 370/442; 331/110

[58] Field of Search .......... 455/403, 422, 455/100, 434, 436, 101, 455, 105, 517, 114–115, 524, 117, 63, 67.1, 67.3, 68–70, 73, 78, 79–80, 82, 83–84, 88, 550, 121, 561, 563, 575, 226.1, 226.2, 226.3; 395/2.35, 2.36, 2.37, 2.42; 379/406, 410; 381/110, 94.1–94.3; 370/443, 442, 435, 252, 294, 331, 321, 337, 347

[56] References Cited

U.S. PATENT DOCUMENTS

| | | | |
|---|---|---|---|
| 5,239,557 | 8/1993 | Dent | 455/422 |
| 5,475,712 | 12/1995 | Sasaki . | |
| 5,612,955 | 3/1997 | Fernandes et al. | 455/83 |
| 5,619,566 | 4/1997 | Fogel | 379/406 |
| 5,625,687 | 4/1997 | Sayre, III | 370/435 |
| 5,630,016 | 5/1997 | Swaminathan et al. | 395/2.37 |

FOREIGN PATENT DOCUMENTS

| | | |
|---|---|---|
| 0 593 255 A1 | 10/1993 | European Pat. Off. . |
| 42 16911 A1 | 11/1992 | Germany . |
| 940056487 | 3/1994 | Japan . |
| 2 256 351 | 5/1991 | United Kingdom . |

OTHER PUBLICATIONS

IEEE Global Telecommunications Conference & Exibition; Globecom 1989; vol. 2, 27–30 Nov. 1989, Dallas, Texas; pp. 1070–1074, XP000091191; Southcott et al.; "Voice Control of the Pan–European Digital Mobile Radio System" pp. 1070, col. 2—p. 1071, col. 1, line 7.

*Primary Examiner*—Reinhard J. Eisenzopf
*Assistant Examiner*—Doris To
*Attorney, Agent, or Firm*—Jenkens & Gilchrist, P.C.

[57] ABSTRACT

A method and apparatus for controlling the use of discontinuous transmission in a cellular telephone. The preferred embodiment of the present invention includes a voice activity detector for detecting the presence or absence of speech and an energy detector for measuring the energy level of sound input to a microphone of a cellular telephone during the absence of speech. The present invention also includes a comparator for comparing the measured noise energy level against a threshold value. The determination as to the presence or absence of speech and the output of the comparator are provided to a controller. The controller enables discontinuous transmission when the energy level detected during the absence of speech is less than or equal to the threshold value and disables discontinuous transmission when the measured energy level exceeds the threshold value.

8 Claims, 4 Drawing Sheets

METHOD AND APPARATUS FOR CONTROLLING THE USE OF DISCONTINUOUS TRANSMISSION IN A CELLULAR TELEPHONE

BACKGROUND OF THE INVENTION

1. Technical Field of the Invention

The present invention pertains in general to the use of a discontinuous transmission mode in cellular telephones, and more particularly, to a method and apparatus for controlling the use of discontinuous transmission in cellular telephones using the International Standard-136 protocol or other similar air interface standards.

2. Description of Related Art

To conserve battery power and decrease interference on cellular telephone radio frequencies, cellular telephones are frequently equipped to operate in a discontinuous transmission mode. When the cellular telephone is not operating in discontinuous mode, the transmitter of the cellular telephone is always transmitting regardless if speech is present or not. When operating in discontinuous mode, however, the cellular telephone transmitter is active only during periods when speech is present and is otherwise disabled unless the cellular telephone transmits data for messages and signaling.

To detect the presence of speech, cellular telephones employ Voice Activity Detectors (VAD) which are well known in the industry. The voice activity detector detects the presence or absence of speech. The sound from the microphone can be digitized prior to measurement by the voice activity detector. The output of the voice activity detector sets and clears a binary flag which activates and deactivates the transmitter in the cellular telephone. When the transmitter is switched off a speech decoder in the base station can insert comfort noise to ensure that the person on the other end of the telephone call hears background noise and not silence which may cause concern as to whether the call has been terminated.

Different standards used in the cellular telephone industry incorporate various methods for implementing discontinuous transmission. In standards such as the International Standard-136, there is no maximum time limit specified regarding the length of time that the cellular telephone is allowed to disable its transmitter. As the length of time which the transmitter is disabled increases, it becomes increasingly more difficult for the base station to recreate an appropriate synthesized background noise for the listener. While this may not cause problems in a relatively silent environment such as in an office, use in a noisy environment, such as while driving in an automobile at high speeds, renders this method insufficient for preserving the subjective quality during periods of non-speech. In a noisy environment, the actual background noise transmitted during periods of speech differs greatly from the synthesized background noise creating an unpleasant experience for the listener.

It would be advantageous therefore, to device a method and apparatus allowing the use of discontinuous transmission in quiet environments while disabling the use of discontinuous transmission in noisy environments. Furthermore, it would be advantageous for such a method and apparatus to be implemented either within the cellular telephone or within a base station of the cellular telephone network.

SUMMARY OF THE INVENTION

The present invention comprises a method and apparatus for controlling the use of discontinuous transmission in a cellular telephone using the International Standard-136 protocol or similar air interface having no specified maximum time limit for disabling transmissions during operation in a discontinuous transmission mode. To eliminate the problem of synthesizing an appropriate background noise, discontinuous transmission is disabled when the background noise of a cellular telephone call is above a threshold value. An energy detector measures the energy level of the background noise during periods of non-speech and a comparator compares the measured energy level against the threshold value. In those instances where no speech has been detected and the measured energy level of the background noise exceeds the threshold value, a controller disables discontinuous transmission resulting in the transmitter transmitting during both periods of speech and non-speech with the background noise being transmitted by the cellular telephone providing the listener with actual background noise. In those instances where the measured energy level is equal to or below the threshold value, the controller enables discontinuous transmission thereby disabling the transmitter of the cellular telephone during periods of non-speech and providing the listener with background noise synthesized by the cellular telephone network.

In a first embodiment of the present invention, control of discontinuous transmission occurs within the cellular telephone. In a second embodiment of the present invention, control of discontinuous transmission occurs within a base station serving the cellular telephone.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
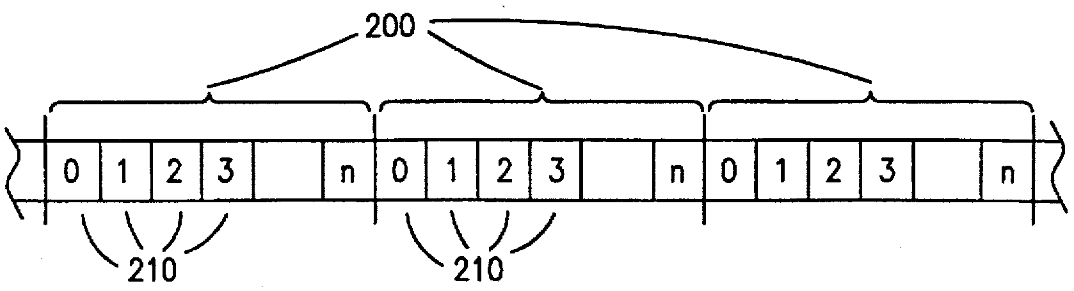
FIG. 1 illustrates a portion of a cellular telephone transmission divided into multiple frames which are further divided into multiple time slots using time division multiple access.

Referring now to FIG. 1 there is illustrated multiple frames 200 of an uplink transmission from a cellular telephone. The cellular telephone is assigned one time slot within a plurality of time slots 210 comprising each frame 200. When operating in a discontinuous transmission mode, the cellular telephone enables or disables its transmitter during the particular time slot assigned to the cellular telephone during each frame 200 depending on the presence of speech.

Figure 2:
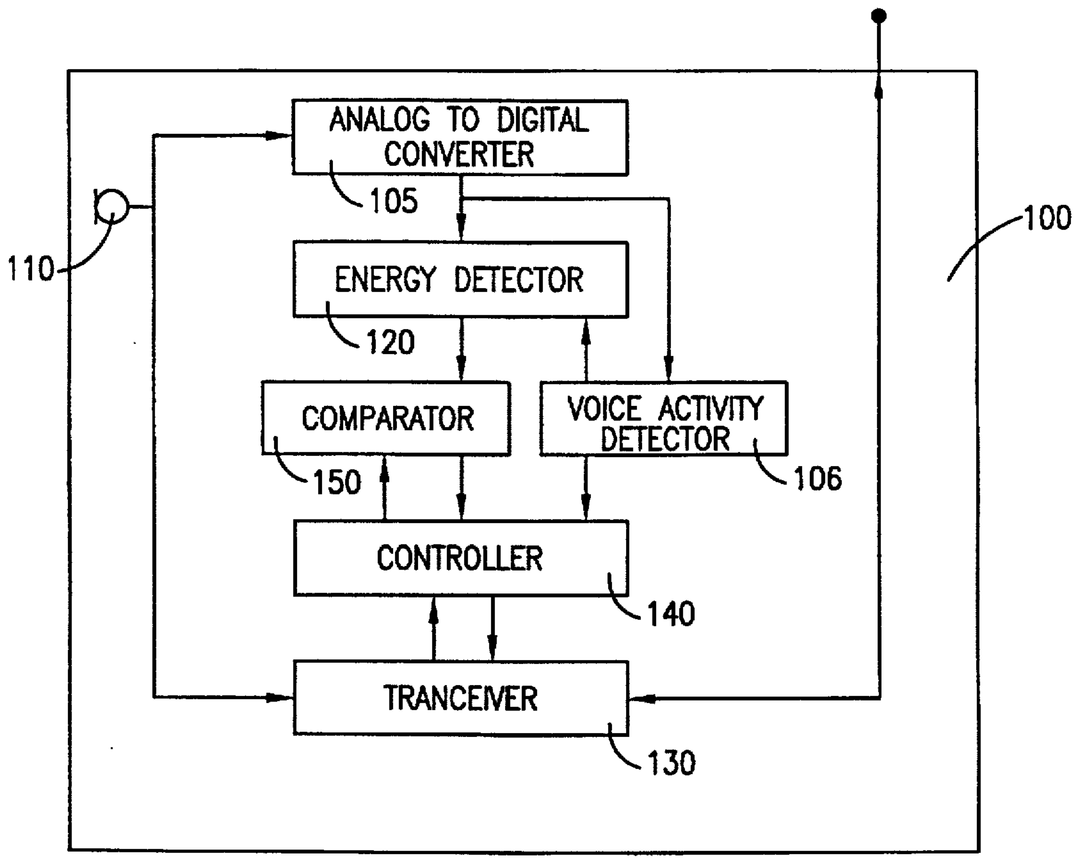
FIG. 2 illustrates a functional block diagram of a cellular telephone incorporating a first embodiment of the present invention where control of discontinuous transmission occurs within the cellular telephone.

Referring additionally now to FIG. 2, there is illustrated a functional block diagram of a first embodiment of the present invention. A cellular telephone 100 includes a microphone 110 for detecting sounds to be transmitted by the cellular telephone 100. The output signal of the microphone 110 is input to a transceiver 130 and is also digitized by an analogue to digital converter 105. The digitized signal is communicated to both an energy detector 120 which measures the energy level of sound detected by the microphone 110 and to a voice activity detector 106 which distinguishes between sounds which are speech and sounds which are background noise.

The voice activity detector 106 informs a controller 140 and the energy detector 120 of the presence or absence of speech. If the voice activity detector 106 indicates the absence of speech, the energy detector 120 measures the energy level of the noise entering the microphone 110. To obtain an accurate measurement of the noise energy level, the energy detector 120 needs to take and average measurements over several frames. Although there are various methods well known in the industry for measuring the energy level of noise, and it is understood that any method for measuring noise energy level may be employed in the present invention, the following is given by way of example. In the International Standard-136 (IS-136) protocol each frame transmitted by a cellular telephone is represented by one hundred sixty samples. The sum of the square of each sample is used to measure the energy level of the frame according to the following equation:

$$R0 = \sum_{n=0}^{n=159} x(n)^2$$

where RO is the measured energy level and x(n) is the received sound sample. Noise measurements are averaged over fifty frames of non-speech to produce an averaged energy level. For example, the averaging can be implemented as a first order low pass infinite impulse response filter with a time constant corresponding to one second which for the case of Digital Advanced Mobile Phone Service (D-AMPS) corresponds to 50 frames. The filter is implemented according to the following equation:

$$y(m)=y(m-1)+a*(RO(m)-y(m-1))$$

Where:

$y(m)$=updated filter output at frame m $y(m-1)$=filter output of previous frame a=time constant corresponding to 1 second $RO(m)$=output energy level from the current frame when speech is not detected Resultant y(m) is thus the average noise energy level measured over fifty frames of non-speech where each frame is represented by one hundred sixty samples.

The determination by the voice activity detector 106 as to whether or not speech is present is communicated to a controller 140 and to the energy detector 120. If the voice activity detector 106 indicates the absence of speech, the energy detector 120 measures the energy level of the noise input to the microphone 110 and communicates the measurement to a comparator 150. The comparator 150 compares the measured energy level against a threshold value provided to the comparator 150 by the controller 140. The threshold value is a maximum background noise energy level allowed to be present during the absence of speech for the cellular telephone 100 to operate in a discontinuous transmission mode. The threshold value is determined and defined by the cellular telephone provider based on the particular cellular telephone system and equipment. The threshold value can be pre-programed in the cellular telephone 100 or alternatively can be transmitted to the cellular telephone from the cellular telephone network.

The comparator 150 communicates the results of the comparison between the measured energy level and the threshold value to the controller 140. When the voice activity detector 106 indicates to the controller 140 that speech is not present on the microphone 110 and the comparator indicates to the controller 140 that the measured energy level is less than or equal to the threshold value, the controller 140 enables discontinuous transmission. When discontinuous transmission is enabled, the controller 140 directs the transceiver 130 to transmit speech detected by the microphone 110 during periods when the voice activity detector 106 indicates the presence of speech and disables the transmitting function of the transceiver 130 during periods when the voice activity detector 106 indicates the absence of speech. On the other hand, when the comparator 150 indicates to the controller 140 that the measured energy level is above the threshold value, the controller 140 disables discontinuous transmission and instructs the transceiver 130 to transmit during both periods of speech and non-speech.

Figure 3:
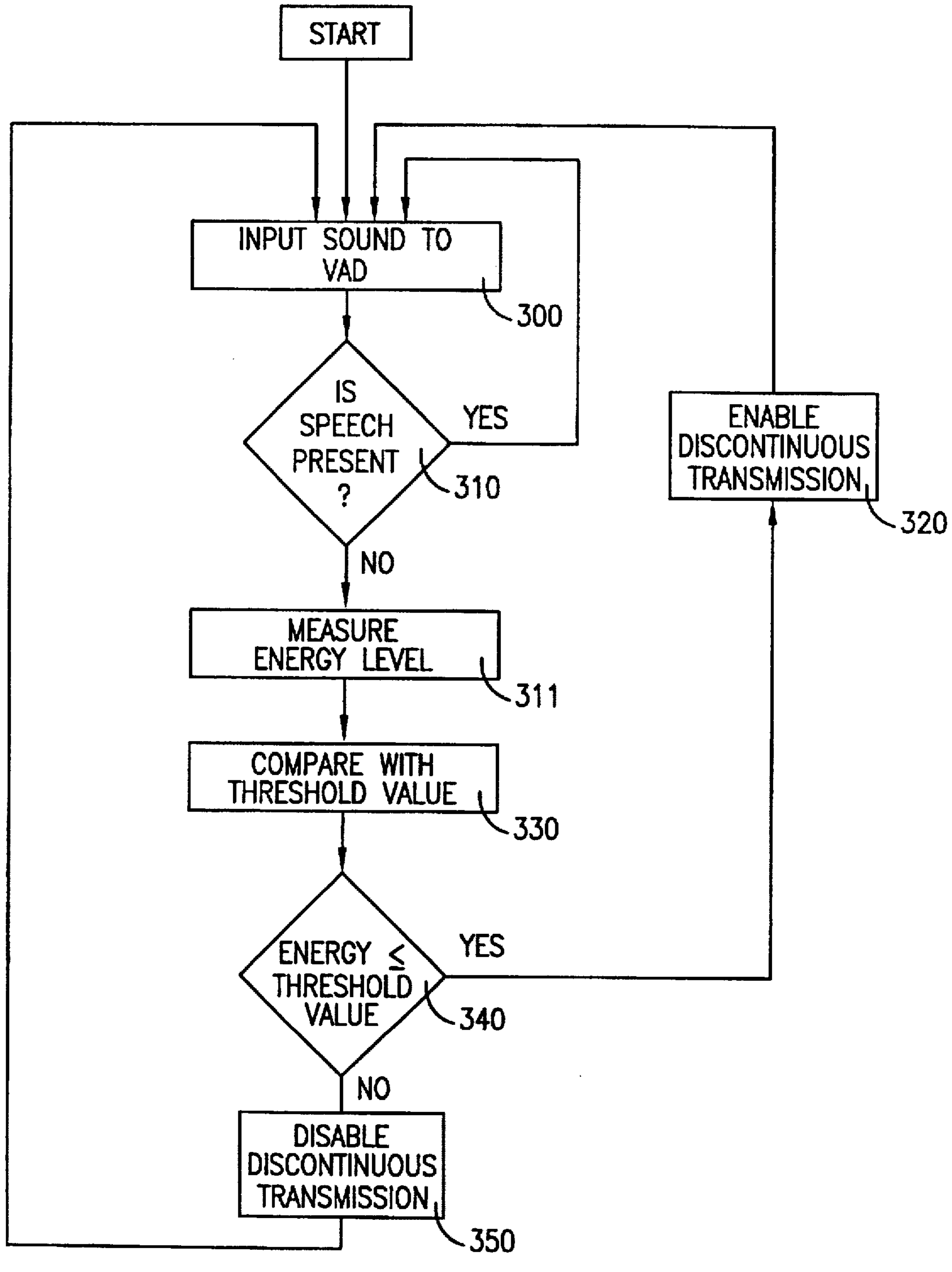
FIG. 3 illustrates a flow diagram for the first embodiment of the present invention.

Referring additionally now to FIG. 3, there is illustrated a flow diagram for the first embodiment of the present invention. When a cellular telephone 100 is active, the sound entering the microphone 110, which frequently has been digitized by the analog to digital converter 105, is input to the voice activity detector 106 (step 300). The voice activity detector 106 determines whether the sound entering the microphone 110 is indicative of speech (step 310). If the voice activity detector 106 indicates that speech is present, the voice activity detector 106 continues to evaluate the sound input to the microphone 110 until the voice activity detector 106 detects the absence of speech. Once the sound is determined to be non-speech, the energy detector 120 measures the energy level of noise entering the microphone 110 (step 311). To obtain an accurate measurement, the energy detector 120 averages the measurement over fifty frames of non-speech. The comparator 150 compares the measured energy level with the threshold value (step 330). If the measured energy level is determined to be less than or equal to the threshold value (step 340) the controller 140 enables discontinuous transmission (step 320). Otherwise, the controller 140 disables discontinuous transmission (step 350). In the first embodiment of the present invention, this process is continuously repeated over the duration of the cellular telephone call.

Figure 4:
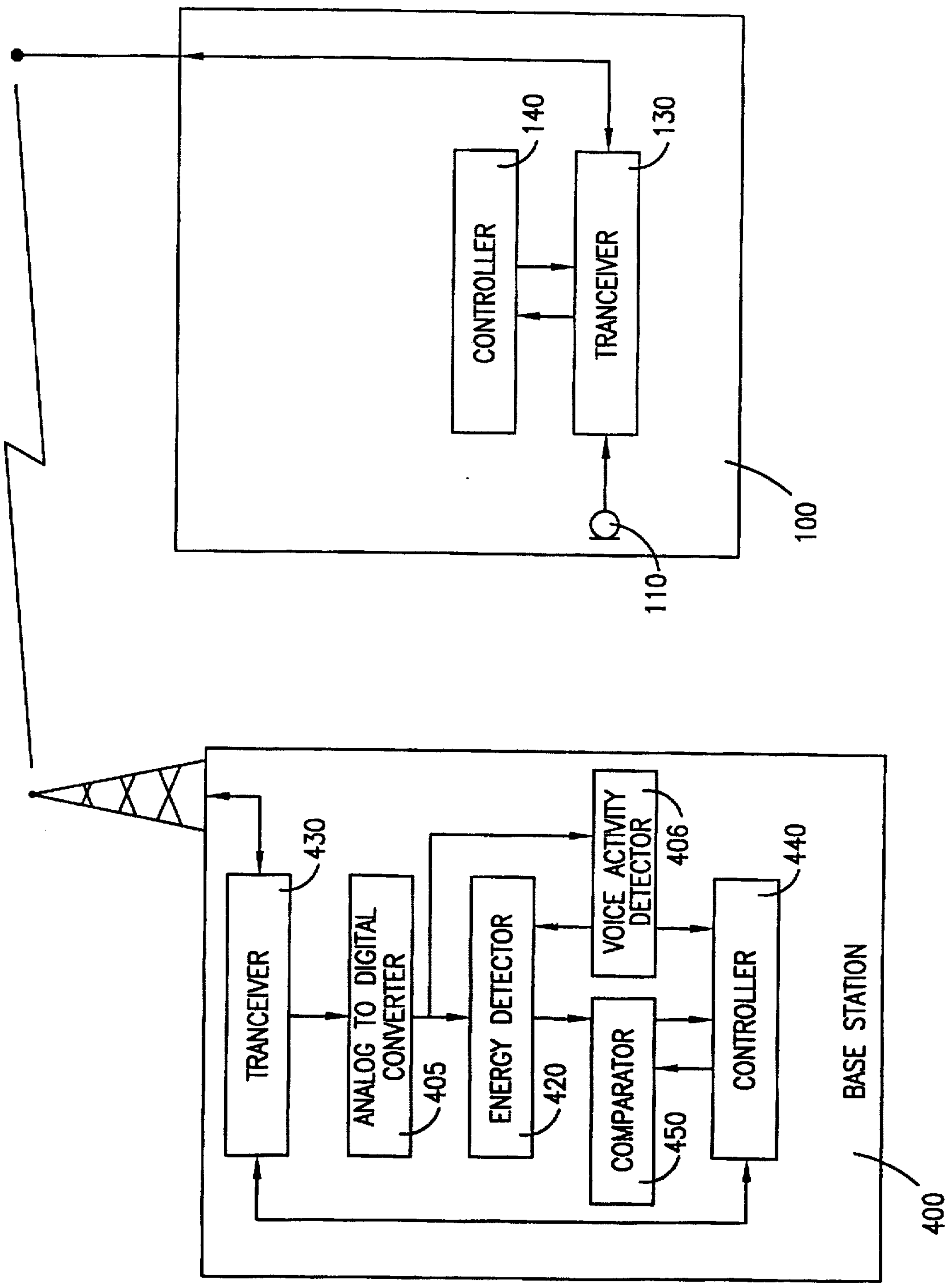
FIG. 4 illustrates a cellular telephone and a base station incorporating a second embodiment of the present invention where control of discontinuous transmission occurs within the base station.

Referring additionally now to FIG. 4, there is illustrated a second embodiment of the present invention. Unlike the first embodiment of the present invention, where the use of discontinuous transmission was controlled by the cellular telephone 100, the second embodiment of the present invention provides for controlling the use of discontinuous transmission from a base station 400 serving the cellular telephone 100. The cellular telephone 100 includes a microphone 110 connected to a transceiver 130. The microphone 110 detects sounds to be communicated by the cellular telephone 100. The controller 140 in the cellular telephone 100 enables and disables discontinuous transmission under the direction of a controller 440 located in the base station 400. Commands from the controller 440 to enable and disable discontinuous transmission are transmitted by the transceiver 430 of the base station 400, received by the transceiver 130 of the cellular telephone 100, and provided to the controller 140.

Following a call set-up or a hand-off of a telephone call from a former serving base station (not shown) to a new base station 400, the controller 440 of the new base station 400 transmits a command via transceiver 430 to the controller 140 of the mobile station 100 to disable discontinuous transmission. Since discontinuous transmission is disabled, all sound detected by the microphone 110 is transmitted by the transceiver 130 to the base station 400 during each time division multiple access frame 200. The transceiver 430 receives these transmissions and provides the signal to both an energy detector 420 and a voice activity detector 406. As in the first embodiment of the present invention, the voice activity detector 406 determines whether or not the sound is indicative of speech and provides the determination as to the presence or absence of speech to the controller 440 and to the energy detector 420. Likewise, the energy detector 420 measures the noise energy level over the duration of fifty frames and provides the measured energy level to the comparator 450. The controller 440 provides the comparator 450 with a threshold value which the comparator 450 compares against the measured energy level provided by the energy detector 420. As in the first embodiment of the present invention, the threshold value is equal to the maximum energy level of noise during periods of non-speech allowed for the operation of discontinuous transmission. The comparator 450 provides the results of the comparison to the controller 440.

The controller 440 makes the determination as to whether to instruct the cellular telephone 100 to operate in discontinuous transmission mode or not. If the measured energy level is greater than the threshold value, the controller 440 instructs the controller 140 in the cellular telephone 100 to maintain operation with discontinuous transmission disabled. On the other hand, if the measured energy level is less than, or equal to, the threshold value, the controller 440 instructs the controller 140 to enable discontinuous transmission. If the controller 440 enables discontinuous transmission, the base station will receive no further background noise, and thus, the cellular telephone remains in discontinuous transmission mode until the next hand-off. However, the controller 440 located within the base station 400 has the ability to send a command to the controller 140 in the cellular telephone 100 to disable discontinuous transmission and begin the process again.

Figure 5:
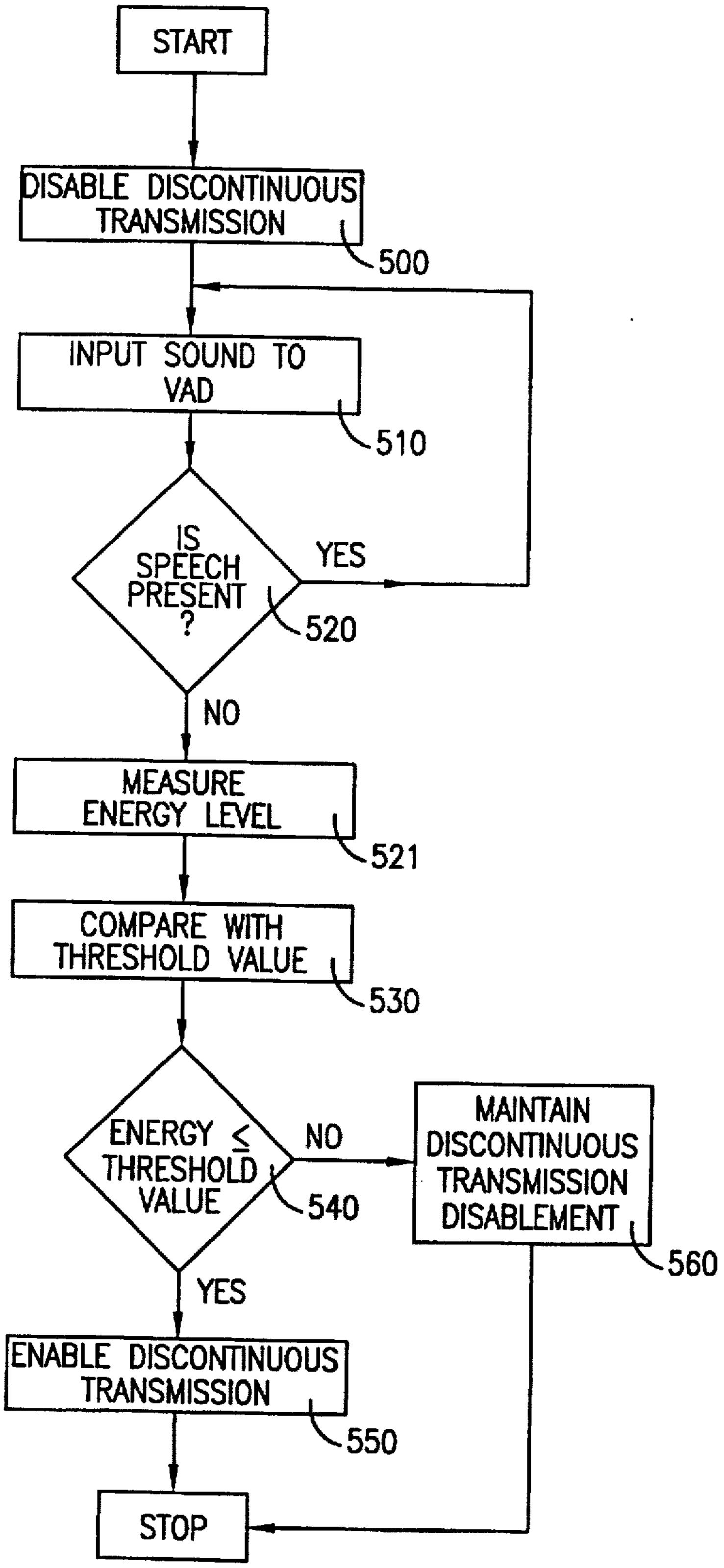
FIG. 5 illustrates a flow diagram for the second embodiment of the present invention.

Referring additionally now to FIG. 5, there is illustrated a flow diagram for the second embodiment of the present invention. Following the call set-up or the hand-off of a cellular telephone call from a former serving base station (not shown) to a new base station 400, the new base station 400 instructs the cellular telephone 100 to disable discontinuous transmission (step 500). Sound entering the microphone 110 is input to the voice activity detector 406 (step 510) which detects the presence or absence of speech (step 520). If the voice activity detector 406 indicates that speech is present, the voice activity detector 406 continues, for each new frame 200, to evaluate the signal transmitted by cellular telephone 100 until the voice activity detector 406 detects the absence of speech. The energy detector 420 within the base station 400 then begins measuring the noise energy level (step 521) of noise detected by microphone 110 within the cellular telephone 100 and transmitted to the base station 400. The energy detector 420 averages the measurement over fifty frames of non-speech to determine an average noise energy level over the period. After fifty frames have been measured, the comparator 450 compares the measured energy level against a threshold value (step 530) and communicates the results of the comparison to the controller 440. If the measured energy level is determined to be less than, or equal to the threshold value (step 540), the controller 440 enables discontinuous transmission (step 550), otherwise, the controller 440 maintains disablement of discontinuous transmission (step 560). The method described in FIG. 5 is conducted following the call set-up or the hand-off of a cellular telephone call to the new serving base station 400 or whenever the controller 440 instructs the cellular telephone 100 to disable discontinuous transmission.

Although the preferred embodiments of the methods and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for controlling the use of discontinuous transmission in a cellular telephone comprising the steps of:
   - detecting the presence or absence of speech input to a microphone of the cellular telephone;
   - measuring an energy level of sound input to the microphone of the cellular telephone when speech is absent;
   - comparing the measured energy level against a threshold value, the threshold value representing a maximum energy level of background noise allowable for use of discontinuous transmission;
   - enabling discontinuous transmission when the comparison indicates that the measured energy level is at or below the threshold value; otherwise
   - disabling discontinuous transmission when the comparison indicates that the measured energy level is greater than the threshold value.

2. The method of claim 1, wherein the steps of detecting, measuring, comparing, enabling, and disabling are preformed by the cellular telephone.

3. A method for controlling the use of discontinuous transmission in a cellular telephone which communicates using time division multiple access, comprising the steps of:
   - detecting the presence or absence of speech input to a microphone of the cellular telephone during each time division multiple access frame;
   - measuring an energy level of sound input to the microphone of the cellular telephone during each time division multiple access frame when speech is absent;
   - comparing the measured energy level against a threshold value, the threshold value representing a maximum energy level of background noise allowable for use of discontinuous transmission;
   - enabling discontinuous transmission during frames when the comparison indicates that the measured energy level is at or below the threshold value; otherwise
   - disabling discontinuous transmission during frames when the comparison indicates that the measured energy level is greater than the threshold value.

4. The method of claim 3, wherein the steps of detecting, measuring, comparing, enabling, and disabling are preformed by the cellular telephone.

5. An apparatus for controlling the use of discontinuous transmission in a cellular telephone comprising:
   - a voice activity detector, positioned within the cellular telephone, for detecting the presence or absence of speech input to a microphone of the cellular telephone;
   - an energy detector, positioned within the cellular telephone, for measuring the energy level of sound input to the microphone of the cellular telephone when the voice activity detector indicates that speech is absent;

a comparator, positioned within the cellular telephone, for comparing the energy level measured by the energy detector against a threshold value, the threshold value representing a maximum energy level of background noise allowable for use of discontinuous transmission; and a controller, positioned within the cellular telephone, for enabling discontinuous transmission when the energy level is at or below the threshold value and for disabling discontinuous transmission when the energy level is above the threshold value.

6. A method for controlling the use of discontinuous transmission in a cellular telephone comprising the steps of:

disabling, by a base station, discontinuous transmission following a cellular telephone call set-up or hand-off;

detecting, by a base station, the presence or absence of speech input to a microphone of the cellular telephone, the microphone output having been transmitted to the base station;

measuring, by the base station, an energy level of sound input to the microphone of the cellular telephone when speech is absent, the sound having been transmitted to the base station;

comparing, by the base station, the measured energy level against a threshold value, the threshold value representing a maximum energy level of background noise allowable for use of discontinuous transmission;

enabling, by the base station, discontinuous transmission when the comparison indicates that the measured energy level is at or below the threshold value; otherwise disabling, by the base station, discontinuous transmission when the comparison indicates that the measured energy level is greater than the threshold value.

7. A method for controlling the use of discontinuous transmission in a cellular telephone which communicates using time division multiple access, comprising the steps of:

disabling, by a base station, discontinuous transmission following a cellular telephone call set-up or hand-off;

detecting, by the base station, the presence or absence of speech input to a microphone of the cellular telephone during each time division multiple access frame, the microphone input having been transmitted to the base station;

measuring, by the base station, an energy level of sound input to the microphone of the cellular telephone during each time division multiple access frame when speech is absent, the sound having been transmitted to the base station;

comparing, by the base station, the measured energy level against a threshold value, the threshold value representing a maximum energy level of background noise allowable for use of discontinuous transmission;

enabling, by the base station, discontinuous transmission during frames when the comparison indicates that the measured energy level is at or below the threshold value; otherwise disabling, by the base station, discontinuous transmission during frames when the comparison indicates that the measured energy level is greater than the threshold value.

8. An apparatus for controlling the use of discontinuous transmission in a cellular telephone comprising:

a voice activity detector, positioned within a base station, for detecting the presence or absence of speech input to a microphone of the cellular telephone, the microphone input having been transmitted to the base station;

an energy detector, positioned within the base station, for measuring the energy level of sound input to the microphone of the cellular telephone when speech is absent, the sound having been transmitted to the base station;

a comparator, positioned within the base station, for comparing the energy level measured by the energy detector against a threshold value, the threshold value representing a maximum energy level of background noise allowable for use of discontinuous transmission;

a controller, positioned within the base station, for transmitting a command to the cellular telephone to enable discontinuous transmission when the energy level is at or below the threshold value, the controller further for transmitting a command to the cellular telephone to disable discontinuous transmission when the energy level is above the threshold value; and a controller, positioned within the cellular telephone, for implementing the commands transmitted from the controller positioned within the base station.

* * * * *